No. 627,671.  
J. KELLY.  
SELF CLOSING COCK.  
(Application filed Feb. 10, 1899.)
Patented June 27, 1899.
(No Model.)
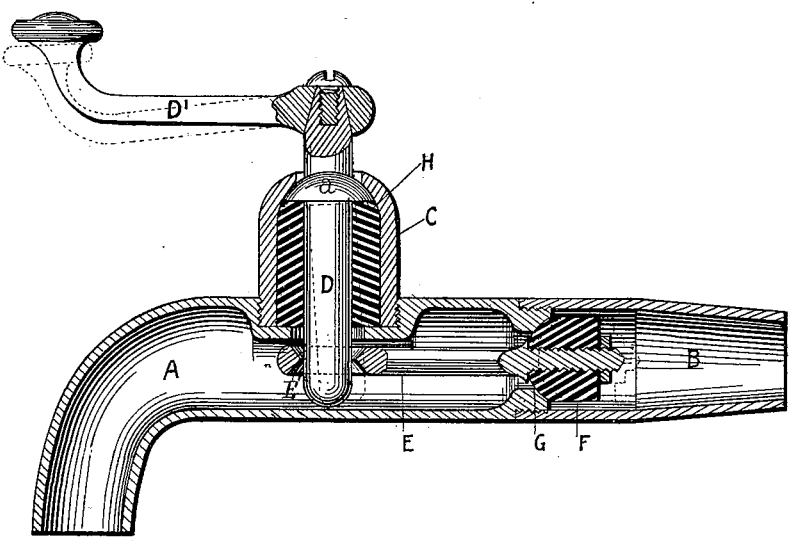
WITNESSES:
INVENTOR:  
John Kelly,  
BY  
ATTORNEYS.

UNITED STATES PATENT OFFICE.

JOHN KELLY, OF CHICAGO, ILLINOIS.

SELF-CLOSING COCK.

SPECIFICATION forming part of Letters Patent No. 627,671, dated June 27, 1899.

Application filed February 10, 1899. Serial No. 705,167. (No model.)

*To all whom it may concern:*

Be it known that I, JOHN KELLY, a citizen of the United States, residing at Chicago, in the county of Cook and State of Illinois, have invented a new and useful Improvement in Self-Closing Cocks, of which the following is a specification.

The object of my improvement is to simplify the construction of a self-closing cock by omitting any variety of connection with the operating-stem requiring it to be rotated to open the valve and substituting therefor a connection between the operating-stem and valve, whereby the stem need be merely turned on a fulcrum at an angle to its longitudinal axis to effect opening of the valve.

The accompanying drawing illustrates my improvement applied to a self-closing cock of the faucet variety, shown in longitudinal section with a diagrammatic dotted-line representation of the manner of operation.

A is the shell, shown in the conventional form employed in a faucet, having screwed upon it the tubular extension B and containing the valve-chamber and a valve-seat G for a valve F. The valve-stem E, fastened at one end to the valve, extends longitudinally in the chamber and is provided at its opposite end with an eye E′, preferably of V shape in cross-section about its inner circumference, as indicated.

D is the operating-stem, extending through a stuffing-box C, provided between the ends of the shell A and preferably containing a spring H, shown in its preferred form of a sleeve of soft rubber closely fitting the box C and closely surrounding the portion of the operating-stem contained therein, which is shown as bearing against the outer end of the rubber sleeve through the medium of a flange *a*, affording a fulcrum, rounded about its upper surface to conform to and fit the upper end of the box C. The lower end of the stem D enters the eye E′ in the valve-stem, and the drawing shows an operating-handle D′, connected with the outer projecting end of the operating-stem, though neither the handle nor the rubber packing H is an indispensable feature of my invention.

Any suitable form of spring may be substituted for the rubber sleeve; but a spring, though desirable, may without departure from my invention be entirely omitted and the fluid-pressure behind the valve depended on for its closure.

To open the valve F, the operator by exerting pressure against the outer projecting portion of the stem D, using the flange *a* as a fulcrum, forces the operating-stem to the position indicated by dotted lines, whereby the resultant displacement of its lower end engages it with the eye E′ to press the inner end of the valve-stem backward and unseat the valve. A handle D′ facilitates the operation and requires therefor merely to be pressed downward to the dotted-line position represented.

What I claim as new, and desire to secure by Letters Patent, is—

1. In a self-closing cock, the combination with a shell containing a chamber and a valve-seat therein, of a stuffing-box extending laterally from said shell, a valve having a stem in said chamber, and an operating-stem extending lengthwise through said stuffing-box into said chamber and into engagement at its inner end with said valve-stem and provided between its ends with a flange on which it is fulcrumed in said stuffing-box to adapt it to be turned on its fulcrum to actuate said stem lengthwise to unseat the valve, substantially as described.

2. A self-closing cock comprising, in combination, a shell containing a chamber and a valve-seat therein, a stuffing-box extending laterally from said shell and containing a spring, a valve having a stem in said chamber, and an operating-stem, extending lengthwise through said stuffing-box into said chamber and into engagement at its inner end with said valve-stem and fulcrumed between its ends to be turned on its fulcrum in a plane lengthwise of said stem to actuate it to unseat the valve, substantially as described.

3. A self-closing cock comprising, in combination, a shell containing a chamber and a valve-seat therein, a valve F having a stem E, a stuffing-box C containing a rubber sleeve H, and an operating-stem D extending through said stuffing-box into said chamber to engage therein with said valve-stem and provided with a flange *a* at which it seats and fulcrums on said sleeve, whereby turning the operating-stem on its fulcrum moves the valve-stem to unseat the valve, substantially as described.

4. A self-closing cock comprising, in combination, a shell containing a chamber and a valve-seat therein, a valve F having a stem E provided with an eye E', a stuffing-box C containing a rubber sleeve H, and an operating-stem D extending through said stuffing-box into the chamber to engage said eye and provided with a flange a at which it seats and fulcrums on said sleeve, whereby turning the operating-stem on its fulcrum moves the valve-stem to unseat the valve, substantially as described.

5. A self-closing cock comprising, in combination, a shell containing a chamber and a valve-seat therein, a valve F having a stem E provided with an eye E', a stuffing-box C containing a rubber sleeve H, an operating-stem D extending through said stuffing-box into the chamber to engage said eye and provided with a flange a at which it seats and fulcrums on said sleeve, and a handle D' on the outer end of said operating-stem, the whole being constructed and arranged to operate substantially as described.

JOHN KELLY.

In presence of—
M. J. FROST,
R. T. SPENCER.